United States Patent [19]

Swinehart et al.

[11] Patent Number: 4,726,388
[45] Date of Patent: Feb. 23, 1988

[54] AUTOMATIC VEHICLE WASHING EQUIPMENT

[76] Inventors: Lonn L. Swinehart, 1215 Seventh St., North Canton, Ohio 44720; Robert L. Messick, 4598 Meadowview Dr., Canton, Ohio 44718

[21] Appl. No.: 630,433

[22] Filed: Jul. 13, 1984

[51] Int. Cl.$^4$ .............................................. B08B 3/02
[52] U.S. Cl. ...................................... 134/45; 134/123; 134/56 R
[58] Field of Search .................... 134/43, 44, 45, 56 R, 134/57 R, 58 R, 123; 118/323, 671, 680, 681; 34/243 C, 229; 15/DIG. 2, 53 A, 53 AB

[56] References Cited

U.S. PATENT DOCUMENTS

| | | | |
|---|---|---|---|
| 2,900,950 | 8/1959 | Peeps | 118/2 |
| 3,224,108 | 12/1965 | Flaming | 118/323 X |
| 3,255,037 | 6/1966 | Knight et al. | 118/323 X |
| 3,279,421 | 10/1966 | Tilney et al. | 118/680 |
| 3,410,284 | 11/1968 | Burger | 134/57 |
| 3,451,094 | 6/1969 | Kywi | 15/302 |
| 3,533,422 | 10/1970 | Alimanestiano | 134/45 |
| 3,559,659 | 2/1971 | Gougoulas | 134/45 |
| 3,570,042 | 3/1971 | Solomon | 34/243 C |
| 3,573,862 | 4/1971 | Brown | 134/123 |
| 3,593,308 | 7/1971 | Fagan | 340/172.5 |
| 3,645,282 | 2/1972 | Kurronen | 134/45 |
| 3,646,521 | 2/1972 | Porter | 340/172.5 |
| 3,709,190 | 1/1973 | von Gottberg et al. | 118/680 |
| 3,724,415 | 4/1973 | Knight | 118/323 X |
| 3,854,054 | 12/1974 | Conn, Jr. | 134/45 X |
| 3,989,003 | 11/1976 | Fagan | 118/2 |
| 3,996,998 | 12/1976 | Wiley | 15/DIG. 2 |
| 4,472,889 | 9/1984 | Hanna | 34/243 C X |
| 4,562,848 | 1/1986 | Messing et al. | 134/123 |

FOREIGN PATENT DOCUMENTS 2310848 12/1973 Fed. Rep. of Germany ........ 134/45

Primary Examiner—Harvey C. Hornsby
Assistant Examiner—Frankie L. Stinson
Attorney, Agent, or Firm—Michael Sand Co.

[57] ABSTRACT

Equipment for automatically washing a vehicle as it is being moved by a conveyor through a treatment area. A horizontal spray bar is movably mounted on the vertical legs of an inverted U-shaped frame for vertical movement along the frame to maintain a generally constant spacing from the vehicle surface as it is being moved beneath the spray bar by the conveyor. The spray bar frame is pivotally mounted on a main stationary support frame to enable the spray bar to pivot out of the path of a moving vehicle in the event of malfunction of the spray bar raising mechanism. A sensing station having a plurality of vertical spaced sensors is located at the entrance to the treatment area and directs a plurality of horizontal sensing beams across the path of the vehicle. The beams are broken and closed in relationship to the profile of the moving vehicle and send signals to a programmable controller. The controller also receives signals from the conveyor representing the linear horizontal movement of the vehicle caused by movement of the conveyor. The combination of the signals from the conveyor and sensors is correlated by the controller which supplies signals to the spray bar drive motor to control the vertical movement and speed of the spray bar to maintain the predetermined maximum efficient spacing of the spray bar from the vehicle surface. Signals are also sent by the controller to a second motor which rotates the spray bar so that the spray nozzles are maintained generally perpendicular to the vehicle surface in addition to the desired spacing to obtain the maximum cleaning results.

30 Claims, 17 Drawing Figures

AUTOMATIC VEHICLE WASHING EQUIPMENT

TECHNICAL FILED

The invention relates to equipment for atuomatically washing vehicles which are moved through a wash station by a conveyor, and in which spray nozzles are maintained at the most efficient distance and discharge direction with respect to the vehicle surface as it moves through the wash station. More particularly, the invention relates to such vehicle washing equipment in which a vertically movable and rotational horizontal spray bar is used to provide the desired spray spacing and direction, and in which the movement of the spray bar is controlled by a plurality of photoelectric sensors located upstream of the spray bar which detect the profile of the vehicle as it moves through the sensing station.

BACKGROUND ART

Numerous types of automatic vehicle wash equipment have been devised for washing vehicles automatically in the most efficient manner and with as few as employees as possible. Such vehicle wash equipment takes many different shapes, configurations, and constructions in an attempt to achieve the most efficient vehicle washing system. In many of these existing systems, the vehicle is driven into the wash station and is stopped whereupon the equipment moves with respect to the stationary vehicle. Some examples of such equipment for washing a stationary vehicle are shown in U.S. Pat. Nos. 3,102,545; 3,187,359; 3,368,572; 3,451,094;3,533,422; 3,545,459; 3,578,775; 3,604,434; 3,606,895; 3,645,282; 3,786,823; and 3,844,480. In other types of existing vehicle washing equipment the vehicle is moved through the wash station by a power driven conveyor or the like, and a plurality of spray nozzles apply pressurized fluid against the vehicle in combination with brushes that contact the vehicle as it moves through the wash station or bay. Examples of these types of vehicle washing equipment are shown in U.S. Pat. Nos. 3,391,700; 3,701,356; 3,421,169; and 3,557,808. A combination of the stationary and movable washing equipment is shown in U.S. Pat. No. 3,826,269.

Although some of these prior types of automatic vehicle washing eqiupment do clean the vehicle satisfactorily, in many instances some dirt will be left on the vehicle and other areas cleaned less satisfactorily than desired due to the distance of the spray nozzles from the vehicle. Also, many of these prior devices used rotating brushes or moving strips of fabric which contact the vehicle surface to remove the dirt. Even though these brushes and fabric strips are made from flexible material they still may scratch or mark the vehicle surface It is known in the vehicle washing art that high pressure spray nozzles, if placed at a distance of from 8 to 12 inches from the vehicle surface with the nozzles being directed generally perpendicular toward the surface, provide an extremely efficient cleaning action without requiring any foreign material such as brushes or fabric strips contacting the vehicle surface. However, due to the differences in vehicle sizes and shapes that will enter an automatic wash facility the distance of the nozzles from the surface must vary considerably to insure that none of the nozzles contact the vehicles resulting in possible damage thereto.

Several types of vehicle wash equipment have attempted to provide a spray bar or spray nozzles which closely follow the contour of the vehicle in an attempt to maintain the nozzles within the preferred distance regardless of the vehicle profile. Examples of such equipment is shown in U.S. Pat. Nos. 3,410,284 and 3,533,422. The equipment of the first mentioned patent uses a horizontal vertically movable spray bar which is controlled by a photoelectric beam mounted directly on the vertically movable member. The beam attempts to detect the contour of the vehicle for raising and lowering the horizontal spray bar to a desired washing position. The bar is moved in accordance with the amount of beam intercepted by the vehicle. In the last mentioned patent, the vehicle is stationary and a U-shaped bar is moved horizontally along the vehicle. A vertically movable spray bar attempts to move in accordance with the contour of the vehicle by a pair of vertically spaced photoelectric sensors mounted on the bar. The sensors provide control signals for raising and lowering the spray bar in addition to controlling the horizontal movement thereof in an attempt to have the spray bar follow the contour of the stationary vehicle.

Photoelectric sensors also have been used in certain paint spraying operations in order for the spraying application to follow the contour of a part of a vehicle in which the spray pattern is dependent upon the profile of the vehicle or part thereof being sprayed. Examples of such paint spray control systems are shown in Pat. Nos. 3,593,308; 3,646,521; and 3,989,003.

DISCLOSURE OF THE INVENTION

Objectives of the invention include providing improved automatic vehicle washing equipment for use in vehicle washing facilities wherein the vehicle is moved continuously by a conventional conveyor through a washing bay or station and a vertically movable horizontal spray bar containing a plurality of spray nozzles extends transversely across the path of the moving vehicle and moves vertically in conformity to the contour of the vehicle being washed so that the nozzles are maintained at a predetermined cleaning position from the vehicle surface regardless of the vehicle configuration and size to achieve the most efficient high pressure cleaning of the vehicle. Still another objective is to provide such improved vehicle washing equipment in which the vertically movable spray bar is rotated in association with the contour of the vehicle so that the spray fluid is impinged generally perpendicularly against the vehicle surface regardless of the location of the particular surface of the vehicle to increase the cleaning efficiency thereof, and in which the nozzles may be oscillated through a predetermined angle to increase the agitation of the spray cleaning liquid against the surface.

A further objective of the invention is to provide such improved vehicle washing equipment in which the spray bar is moved vertically by a three-speed reversible drive motor and interconnected flexible cables and timing chain assembly, in which the cables are connected to both ends of the spray bar and move in unison to prevent binding of the spray bar within a pair of space vertical tracks, in which the speed of the drive motor is adjustable to enable the nmovement of the spray bar to coincide with the particular profile of the vehicle being cleaned, and in which a second motor rotates the spray bar and attached nozzles to provide the preferred impingement angle of the liquid against the vehicle surface. Another object is to mount the spray bar on an inverted U-shaped frame which is pivotally mounted at an upper end and which is provided with a plurality of safety wheels on the spray bar so that in the event the drive mechanism for raising and lowering the spray bar malfunctions, the vehicle will contact the safety wheels and pivot the spray bar out of the path of the moving vehicle to prevent damage to the vehicle and cleaning equipment, and in which a spring actuated latch mechanism maintains the pivotally mounted spray bar frame in the vehicle washing position to prevent the frame from vibrating due to the back pressure created by the proximity of the spray nozzles with respect to the vehicle surface.

A further objective of the invention is to provide such improved automatic vehicle washing equipment in which a sensing station is located a predetermined distance forward of the horizontal spray bar and is provided with a plurality of photoelectric detectors, preferably infrared, which are connected to a programmable controller for providing signals to the spray bar drive motors for controlling movement of the spray bar, in which the vehicle moving conveyor is provided with a proximity probe which provides a series of pulses to the controller, and in which the spray bar drive motor also has a proximity probe which feed pulses to the controller for coordinating its movement for receiving its instructions from the vertically spaced infrared sensors upstream of the spray bar. Another objective is to provide the spray bar drive motor with multiple speeds, preferably three, to provide a slow, medium and fast speed to the spray bar to enable the spray bar to conform to the various vehicle profiles without effecting the efficient spacing desired to be achieved between the nozzles and the vehicle surface.

A still further objective of the invention is to provide such improved automatic vehicle washing equipment which is of a relatively simple, inexpensive and sturdy construction, which is able to be installed in existing vehicle washing facilities, in which the rotational vertically moveable spray bar can be used for applying a cleaning liquid, a liquid wax or other types of cleaning liquid on a vehicle by the use of existing fluid supply systems which are connected to the spray bar through a flexible hose and rotary union, in which the mechanical structure is formed of readily available and relatively inexpensive structural steel components, and in which a usual programmable controller is used for controlling the operation of the drive bar motors.

These objectives and advantages are obtained by the improved automatic vehicle washing equipment, the general nature of which may be stated as including a vertically moveable horizontal spray bar having a plurality of nozzles mounted in spaced relationship thereon for spraying fluid under pressure onto a vehicle moving along its path transverse to the spray bar; means for connecting the spray bar to a source of fluid to be sprayed on the moving vehicle; frame means located adjacent the path of the moving vehicle for moveably mounting the spray bar thereon for vertical and rotational movement; first drive means connected to the spray bar for vertically moving the spray bar along the frame means; second drive means connected to the spray bar for rotating the spray bar; and first and second sensing means, said first sensing means being operably connected to the conveyor for detecting the location of the vehicle along the conveyor and said second sensing means being located a predetermined distance in advance of the spray bar and operably connected with the first and second drive means for controlling the vertical and rotational movement of said spray bar in relationship to the profile of the moving vehicle whereby the nozzles maintain a predetermined generally constant spaced distance from and angular relationship with respect to the vehicle surface throughout the changing profile of said vehicles by the vertical and rotational movement of the spray bar.

BRIEF DESCRIPTION OF THE DRAWINGS

A preferred embodiment of the invention, illustrative of the best mode in which applicants have contemplated applying the principle, is set forth in the following description and is shown in the drawings and is particularly and distinctly pointed out as set forth in the appended claims.

Similar numerals refer to similar parts throughout the drawings.

BEST MODE FOR CARRYING OUT THE INVENTION

Figure 1:
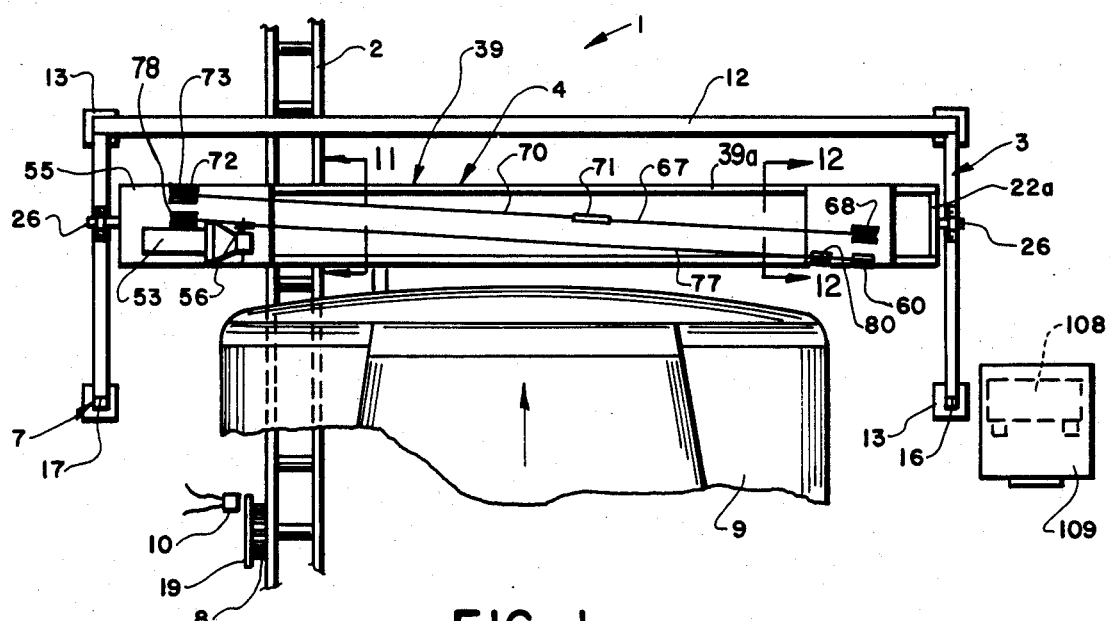
FIG. 1 is a fragmentary diagrammatic top plan view of the improved automatic vehicle washing equipment with a portion of a vehicle being moved by a conveyor past the sensing station and toward the horizontal spray bar.
Figure 2:
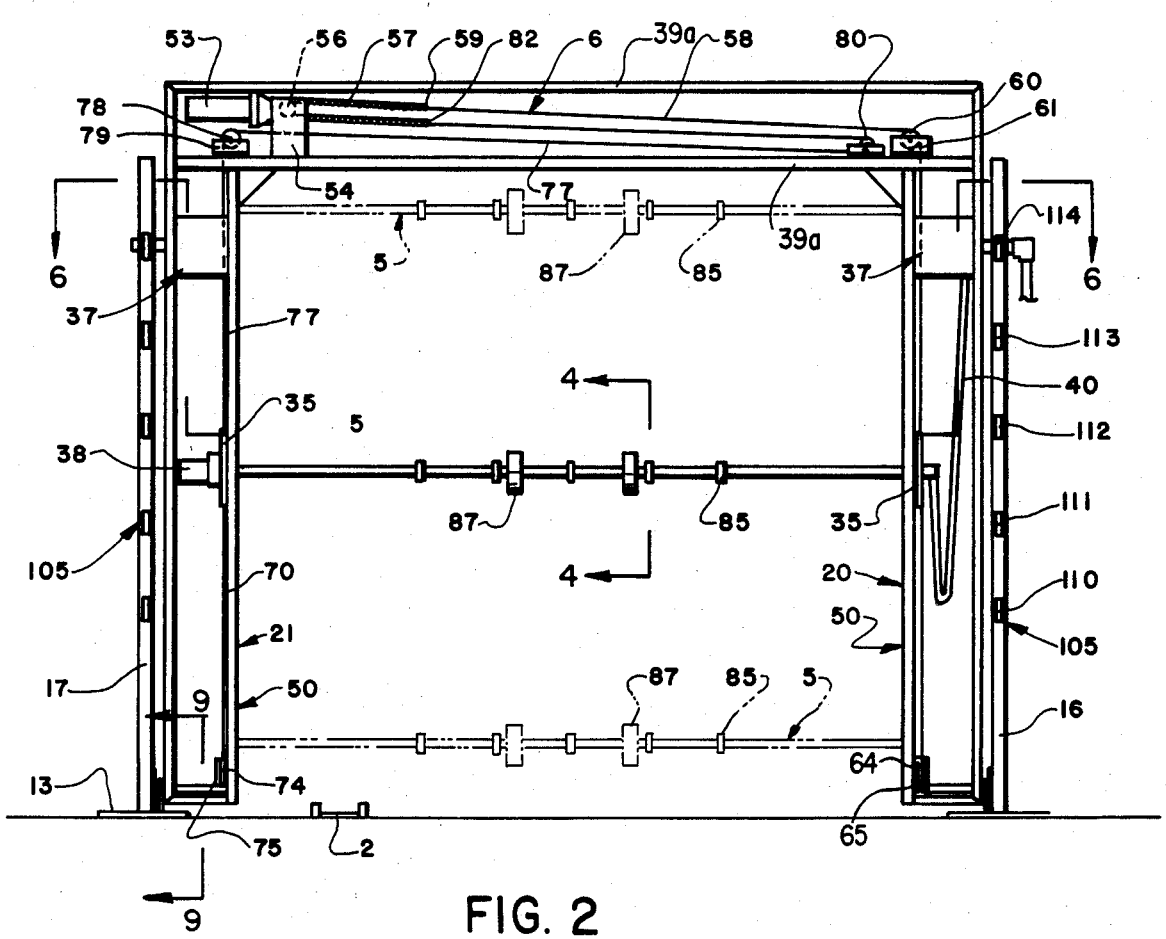
FIG. 2 is a front elevational view of the improved washing equipment of FIG. 1.
Figure 3:
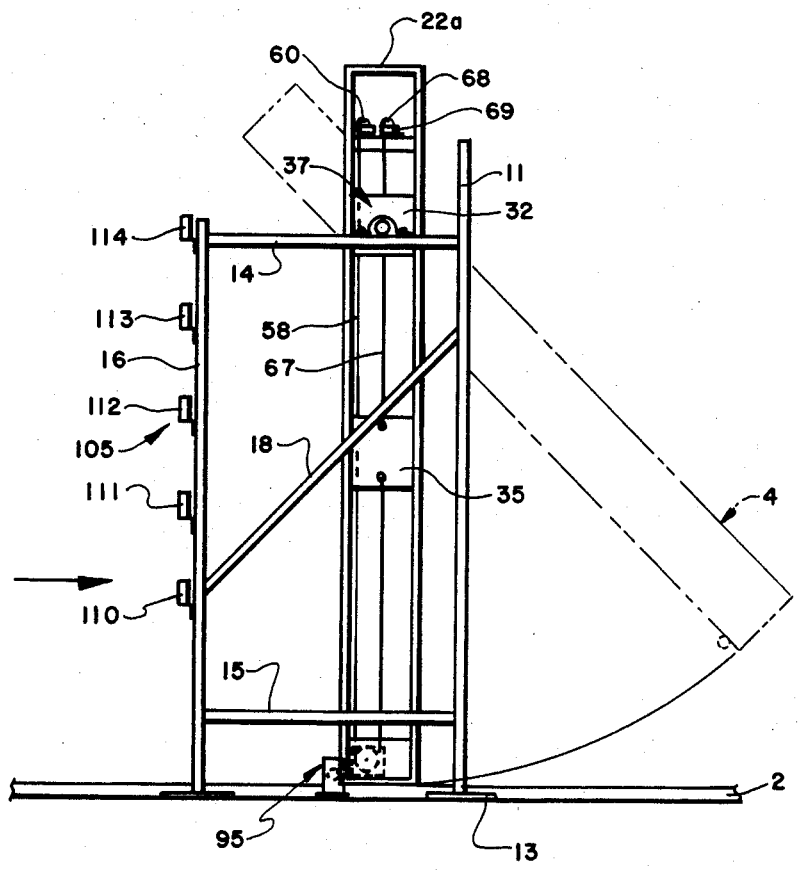
FIG. 3 is a right hand end elevational view of the washing equipment of FIGS. 1 and 2 with the spray bar mounting frame being shown in dot dash lines in a pivoted position.

The improved automatic vehicle washing equipment is indicated generally at 1, and is shown in assembled condition in FIGS. 1, 2, and 3. Equipment 1 is used in conjunction with a usual power driven conveyor 2 which transports a vehicle 9 at a constant rate of speed through the washing station or bay. Equipment 1 includes as its main components a frame 3, an inverted U-shaped spray bar support frame 4, a spray bar 5, a spray drive assembly 6, and a sensing station 7. Conveyor 2 is provided with a sensing wheel 19 that is formed with a series of precisioned spaced holes, and which is mounted on one of the drive sprockets 8 of the conveyor. A series of pulses is generated by a usual proximity probe 10 which magnetically reads the holes in wheel 19 to measure conveyor motion. This motion and pulses generated thereby is used to control the motion of spray bar 5 as described in greater detail below.

Main support frame 3 preferably is formed out of steel channels or angle irons and includes a pair of spaced vertical rear end supports 11 mounted on a supporting floor by pads 13 and connected at their upper end by a horizontal brace 12. A pair of upper and lower members 14 and 15 (FIG. 3) are attached to end supports 11 and extend forwardly therefrom as shown particularly in FIG. 3 and are connected to two front end vertical posts 16 and 17. Diagonally extending reinforcing braces 18 preferably extend between rear corner supports 11 and front supports 16 and 17. Front end supports 16 and 17 form a part of sensing station 7 which is described in greater detail below.

Figure 6:
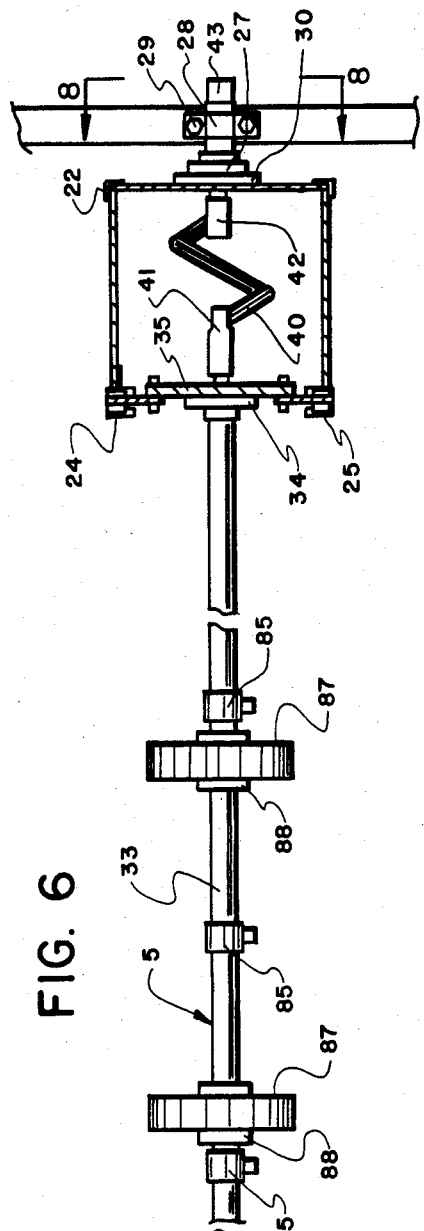
FIG. 6 is an enlarged fragmentary sectional view taken on line 6—6, FIG. 2 showing the spray bar.

U-shaped spray bar support frame 4 includes a pair of rectangularly shaped box-like vertically extending end housings indicated generally at 20 and 21 (FIGS. 2, 3, and 6). Housings 20 and 21 are each formed by a pair of angle irons 22 and 23 (FIG. 6) and spaced inner roller guide channels 24 and 25 which are arranged in a rectangular relationship with respect to each other. Metal sheets or panels (not shown) preferably will be attached to and extend between angles 22 and 23 and guide channels 24 and 25 to form enclosed housings 20 and 21 to reduce water and other foreign material from being deposited on the various components which are described below, that are located within the housings. These covering sheets are removed in the drawings for clarity. The top and bottom of housings 20 and 21 are connected by cross members 22a and 23a respectively to form the rigid box-like housing configuration.

Figure 8:
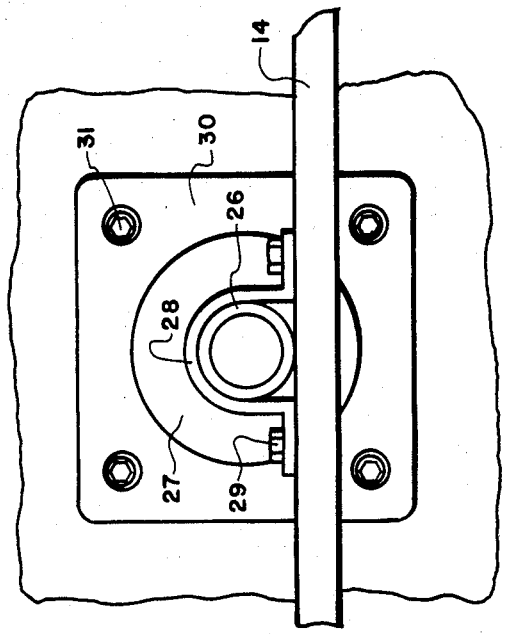
FIG. 8 is an enlarged fragmentary end view looking in the direction of arrows 8—8, FIG. 6.

In accordance with one of the features of the invention, frame 4 is pivotally mounted on main support frame 3 as shown in FIGS. 2, 6, and 8. Support frame 4 is pivotally mounted by a pair of stub shafts 26 which are mounted on housings 20 and 21 by bearings 27 (FIG. 6). Stub shafts 26 are mounted on horizontal frame members 14 by U-shaped straps 28 which are secured thereon by bolts 29. Bearings 27 are mounted on the housings by bearing mounting plates 30 (FIG. 8) which are secured by bolts 31 to an outside wall 32 of a pivot housing indicated at 37, and secured to an upper position of housings 20 and 21. This bearing mounting arrangement is generally the same at both ends of frame 4.

The upper ends of vertical housings 20 and 21 are connected by a horizontal box-like housing 39 formed by members 22a and four spaced angle members 39a. Angle members 39a extend horizontally between vertical housings 20 and 21 and are firmly connected thereto to form inverted U-shaped pivotally mounted frame 4. Housing 39 also preferably is enclosed with metal sheets and panels to protect the equipment and components contained therein.

Spray bar 5 includes a hollow tubular pipe 33 which extends between housings 20 and 21 of inverted U-shaped support frame 4 and is rotatably mounted by a pair of bearings 34 which are mounted on bearing support plates 35 (FIG. 6). Plates 35 are attached by bolts 36 to roller mounting plates 44.

Figure 7:
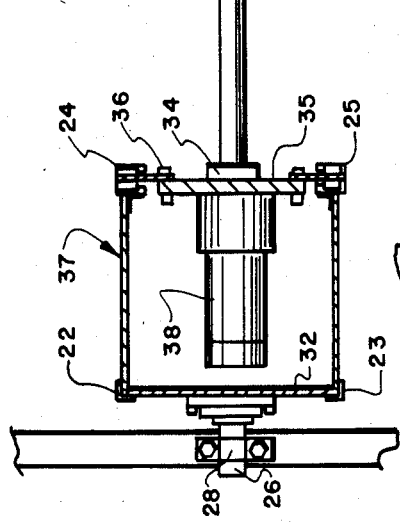
FIG. 7 is an enlarged fragmentary plan view showing the roller mounting arrangement of the spray bar on its pivotally mounted supported frame.

A permanent magnet motor 38 is mounted on plate 35 and is concealed within housing 21 for rotating spray bar 5 through a 360° rotation as described more fully below. The other end of spray bar 5 is connected to a fluid supply hose 40 by a rotary union 41. The other end of fluid supply hose 40 is connected by a hydraulic swivel 42 through hollow stub shaft 26 to a fluid supply line 43. Supply line 43 is connected to a usual source of high pressure fluids such as water although the fluid could contain wax, soap solution or the like. Spray bar 5 is movably mounted on housings 20 and 21 by a plurality of spaced rollers 45 (FIG. 7) which are mounted on shafts 46 extending outwardly from roller mounting plate 44. Rollers 45 are slidably rotatably engaged with inturn end flanges 49 provided by generally enclosed guide channels 24 and 25 which form the inner vertical supports of housings 20 and 21.

Spray bar drive assembly 6 includes a three-speed reversible electric motor 53 mounted on a motor mounting plate 54 (FIG. 2) which is attached to a base plate 55 (FIG. 1) and projects upwardly therefrom. A pulley sprocket 56 is mounted on the shaft of motor 53 and is connected to a section of drive chain 57. A flexible cable 58 is connected to one end 59 of drive chain 57 (FIG. 2) and extends over a pulley 60 which is mounted by a bracket 61 on a pulley support plate 62 located within horizontal top housing 39. Pulley 60 changes the direction of cable 58 from horizontal to vertical whereby it extends downwardly throughout the length of housing 20 and is trained about another pulley 64 mounted at the lower end of housing 20 by a bracket 65. Cable 58 then continues vertically upwardly within housing 20 and is connected to spray bar mounting plate 35. Another section 67 of flexible cable is connected to plate 35 and extends vertically upwardly therefrom and is trained about another pulley 68 mounted by a bracket 69 on mounting plate 62 adjacent pulley 60. Cable 67 is connected to another section of flexible cable indicated at 70 by a turnbuckle 71. Cable 70 continues horizontally across the top of U-shaped support frame 4 and is trained over another pulley 72 mounted on mounting plate 55 by a bracket 73 and then continues vertically downwardly within housing 21 and about a pulley 74 mounted at the bottom of housing 21 by a bracket 75. Cable 70 then extends vertically upwardly and is connected to spray bar mounting plate 35. Another section of flexible cable 77 is connected to the upper end of plate 35 in a similar manner as shown in FIG. 3 for cable sections 58 and 67, and continues upwardly therefrom and is trained about another pulley 78 mounted on plate 55 by a bracket 79. Cable 77 then continues horizontally across the top of support frame 4 and is trained about another pulley 80 mounted by a bracket 81 on plate 62. Cable 77 then returns back across housing 39 and terminates at 82 to the other end of timing chain 57.

With this cable and chain drive arrangement both ends of spray bar 5 are raised and lowered in unison so as to prevent binding of spray bar 5 on its roller guide channels within end housings 20 and 21 and is moved with a positive drive force in both directions. Rotation of drive pulley 56 will move timing chain 57 in either direction which will then move the various sections of flexible cables over their respective pulleys for raising and lowering spray bar 5.

Spray bar 5 has a plurality of spray nozzles 85 mounted in a spaced relationship thereon. Nozzles 85 may be of a usual construction and are attached by bolts or collars to hollow pipe 33 and communicate with openings 86 formed therein through which the fluid flowing through pipe 33 will be discharged through the nozzle opening.

Figure 4:
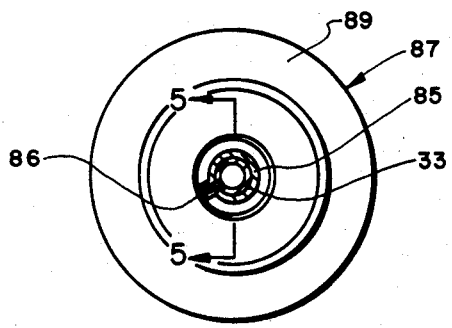
FIG. 4 is an enlarged sectional view taken on line 4—4, FIG. 2.
Figure 5:
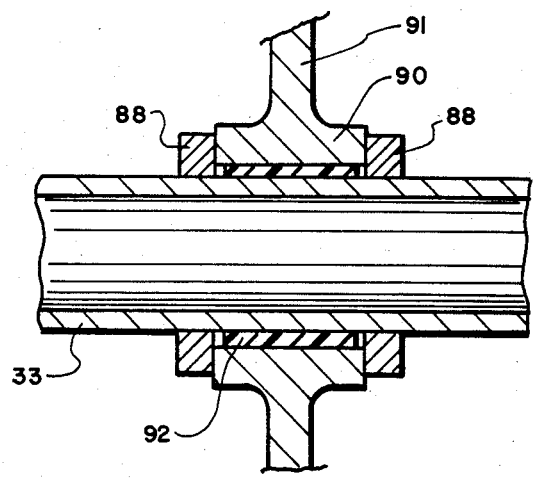
FIG. 5 is a further enlarged fragmentary sectional view taken on line 5—5, FIG. 4 showing the mounting of one of the safety wheels.

Also a pair of safety wheels indicated generally at 87 (FIGS. 4 and 5), are rotatably mounted at spaced intervals on pipe 33 by a pair of locking collars 88. Each wheel 87 includes a resilient outer surface 89 connected to a hub 90 by a disc shaped flange 91. Hub 90 is rotatably mounted on pipe 33 by a bearing sleeve 92.

A releasable latch mechanism indicated generally at 95, is mounted at the lower end of U-shaped spray bar support frame 4 and main support frame 3 for maintaining frame 4 in its vertical upright position during the spray cleaning of a vehicle moving therebetween. Latch 95 prevents wobble and excess vibration of frame 4 due to its pivotal mounting on main support 3 caused by the back pressure due to the close proximity of the spray nozzles with respect to the vehicle surface being cleaned. This releasable latch mechanism is shown particularly in FIGS. 9 and 10.

Figure 9:
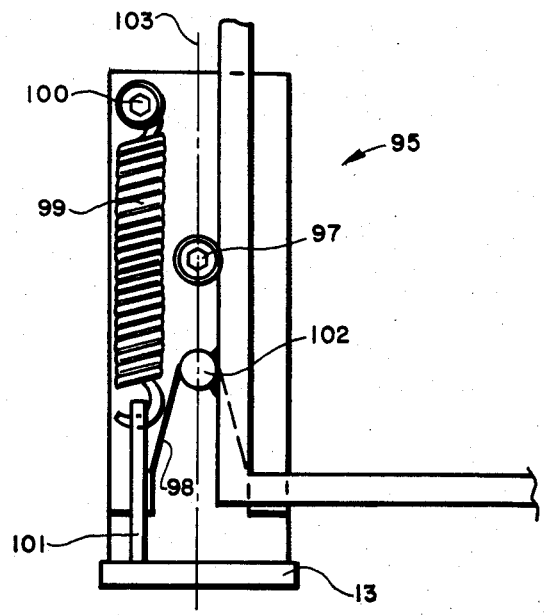
FIG. 9 is an enlarged fragmentary sectional view taken on line 9—9, FIG. 2 showing the latch mechanism holding the spray bar mounting frame in latched position.
Figure 11:
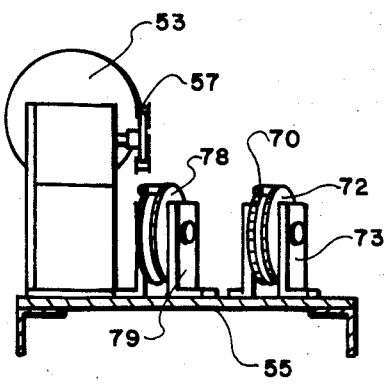
FIG. 11 is an enlarged fragmentary sectional view taken on line 11—11, FIG. 1.

A latch plate 96 is pivotally mounted by bolt 97 on the lower end of support 17 and is formed with an inverted V-shaped notch 98 located vertically beneath pivot bolt 97. Plate 96 is maintained in its vertical aligned position by a tension spring 99 which is connected to an upper corner of plate 96 by bolt 100 and to a post 101 mounted on the lower end of member 17. A short section of rod 102 is attached by welds to the lower end of housing 20 and is engaged within notch 98 when spray bar frame 4 is in its vertical aligned vehicle washing position as shown in FIG. 9.

Figure 10:
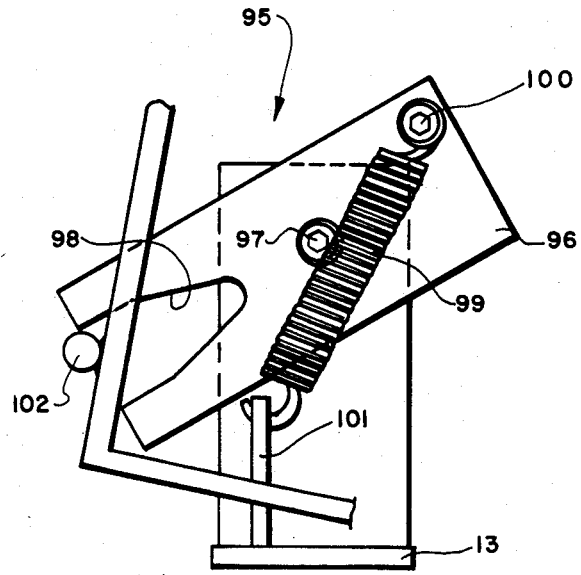
FIG. 10 is a view similar to FIG. 9 showing the spray bar mounting frame in unlatched position.
Figure 12:
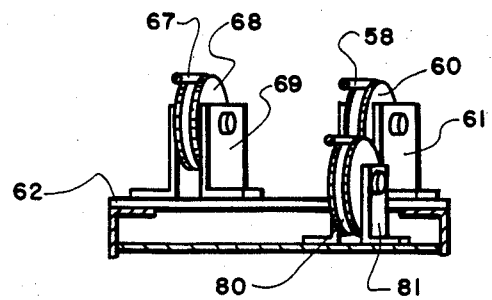
FIG. 12 is an enlarged fragmentary sectional view taken on line 12—12, FIG. 1.

Should the drive mechanism for raising and lowering spray bar 5 malfunction for any reason, when a vehicle is moving between frame 4, the vehicle will contact resilient outer surface 89 of safety wheels 87 pivotally moving spray bar frame 4 in an upward rearward direction as shown in dot dash lines FIG. 3 to prevent damage to the vehicle and to the vehicle washing equipment. As soon as sufficient pressure is applied to frame 4 by a vehicle contacting safety wheels 87, latch rod 102 will attempt to move to the left when viewing FIG. 9 pivotally moving latch plate 96 in a clockwise direction. A relatively small amount of movement of bar 102 will move spring attachment bolt 100 beyond the vertical center line 103 passing through latch pivot bolt 97. Immediately upon movement of bolt 100 beyond centerline 103 the tension in spring 99 will completely pivot latch plate 96 out of its engagement with rod 102 as shown in FIG. 10 permitting the spray bar frame 4 to pivot easily out of the way of the vehicle due to its contact with safety wheels 87.

In accordance with one of the main features of the invention, sensing station 7 is located a predetermined distance in front of the vertical plane of movement of spray bar 5. Sensing station 7 includes vertical front posts 16 and 17 (FIG. 3) having a plurality of sensors indicated generally at 105, mounted thereon and spaced vertically along the posts so as to provide sensing beams extending horizontally between posts 16 and 17. Sensors 105 preferably are photoelectric infrared detectors and consist of a transmitter and receiver mounted horizontally opposite of each other on posts 16 and 17. One type of photoelectric detector found suitable is manufactured and distributed by Namco Controls of Mentor, Ohio, under its catalogue no. EP220. However, other types of sensors can be used satisfactorily without effecting the concept of the invention, such as sonic sensors Five sensors are mounted in spaced relationship on posts 16 and 17 and are indicated by numerals 110, 111, 112, 113 and 114 with 110 being the lowermost sensor and 114 being the uppermost sensor. Sensors 105, spray bar drive motor 53, and rotational motor 38 are all connected to a computer or programmable controller 108 as is proximity probe 10 of conveyor 2. Controller 108 is located in a protective cabinet 109 located adjacent the washing equipment. Drive sprocket 56 for drive chain 57 of spray bar drive motor 53 has the proximity sensor associated therewith so as to emit a series of pulses depending upon the rotational movement of sprocket 56 which corresponds to linear movement of the timing chain 57 and connected flexible cable sections, and accordingly the vertical movement of spray bar 5. The series of pulses are supplied to controller 108 and therein converted to inches thereby monitoring spray bar positions.

In accordance with the invention, a vehicle being moved through the wash bay and through inverted U-shaped frame 4 by conveyor 2 has a washing spray applied at the preferred distance from and against the vehicle surface by the spray nozzles automatically regardless of the profile of the particular vehicle being moved by the conveyor through the equipment. This is accomplished by coordinating the vertical and rotational movement of the spray bar 5 with the vehicle profile which is detected by sensors 105 ahead of or upstream of the spray bar. Preferably the spray nozzles are maintained between 8 and 12 inches from the vehicle surface at all times as the vehicle passes beneath the spray bar and the nozzles are rotated so that the spray emitted therefrom is generally perpendicular against the surface being cleaned. This washing ability is achieved by the particular sensing and operation of the spray bar as described below.

Nearly all vehicles have seven zones requiring washing. Zone 1 is the bumper and grill which is generally vertical. Zone 2 is the hood which is generally horizontal. Zone 3 is the rearwardly upwardly inclined windshield. Zone 4 is the roof which is generally horizontal. Zone 5 is the rear window which slopes downwardly rearwardly. Zone 6 is the rear deck area of the vehicle which is generally horizontal, and Zone 7 is the rear and rear bumper which is generally vertical.

Five sensors 105 are used since it has been discovered that nearly all vehicles will fall within five general profiles. Bottom most sensor 110 is placed at 18 inches above ground level which is the standard bumper height of most vehicles. The next sensor 111 is placed at 30 inches; sensor 112 at 37 inches; sensor 113 at 47 inches and sensor 114 at 53 inches. FIGS. 13-17 shows a diagrammatic profile view of a vehicle with the seven zones being indicated thereon.

A typical example of the sequence of operation of the improved vehicle washing equipment is described below and shown diagrammatically in FIGS. 13-17. The five infrared beam paths are located in a vertical plane approximately 40 inches upstream from the horizontal spray bar. This upstream location provides the programmable controller with "look-ahead" information concerning the vehicle profile at predetermined zones. The vehicle is first sensed by the infrared beam of sensor 110 which is at the bumper height of 18 inches. This instructs the programmable controller to start counting the conveyor pulses emitted by proximity probe 10 thereby monitoring the vehicle position regardless of conveyor speed. For ease of control and coordination of the various components each pulse emitted by proximity probe 10 will correspond to one inch of conveyor or vehicle movement.

Controller 108 is programmed to start the liquid spraying operation after a predetermined movement of conveyor 2 by actuating the spray pump which supplies pressurized fluid through supply hose 40 to spray bar 5. For example, the spray pump will be started by controller 108 after two additional inches of movement of the conveyor after the vehicle is sensed by the beam of sensor 110. At the start of each vehicle washing cycle, spray bar 5 will be at the lowermost position as shown by dot dash lines in FIG. 2 which is horizontally aligned with the vehicle bumper. This signal starts the spray of cleaning liquid against the bumper and grill zone of the vehicle as it is moved toward the lowered spray nozzles by the conveyor. The spray bar will maintain this at-rest, lowered position, spraying liquid generally perpendicularly against the oncoming vehicle grill zone for the next 15 or 20 inches of vehicle movement.

The controller then instructs the spray bar by actuating drive motor 53, to move the spray bar vertically to one of three heights. This initial upward movement of spray bar 5 preferably is at the high speed of the motor. Motor 53 will move spray bar 5 vertically upwardly by the drive cables and timing chain to one of three perdetermined heights; 38 inches for a standard size vehicle; 43 inches for a vehicle having a high hood; and 80 inches for a van or similar type vehicle. The particular height of these three preset heights to which spray bar 5 will be moved is determined by the particular pattern in which various ones of the other infrared beams are broken by the moving vehicle. If only the beam of sensor 111 is broken within a predetermined horizontal movement of the vehicle, the spray bar will move to the 43 inch or intermediate position. If the beams of both sensors 111 and 112 are broken within a predetermined horizontal movement of the vehicle this will indicate that a van is entering the wash station which will move the spray bar to the highermost or 80 inch position. Upon reaching this raised position the controller also instructs the spray bar rotational drive motor 38 to rotate the spray bar 45 degrees downwardly from its heretofore horizontal position so as to be directed generally perpendicularly toward the hood of the vehicle as shown in FIG. 13.

Figure 13:
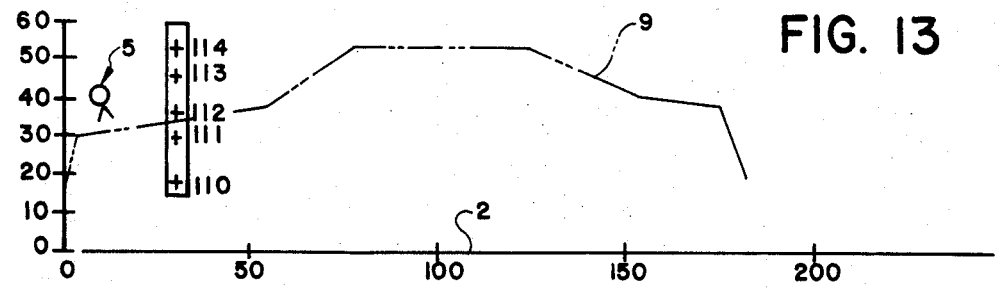
FIGS. 13 through 17 are diagrammatic views showing the sequence of operation of the spray bar as it moves along the surface of a vehicle, the profile of which is determined by the vertically spaced sensors shown therein.
Figure 14:
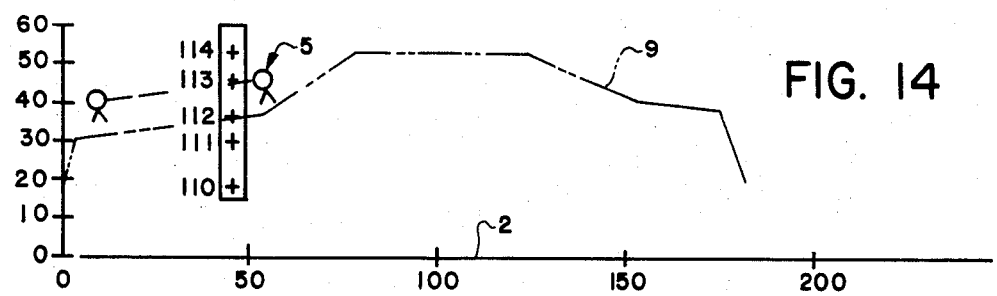

After 45 inches of vehicle movement or 45 pulses generated by proximity probe 10, the controller will reactuate the spray bar drive system moving the spray bar vertically at a slow speed to the 48 inch position as shown in FIG. 14 if it has stopped previously at the 38 inch position as shown in FIG. 13. This enables the spray nozzles to follow the general contour of the hood as shown in FIG. 14.

Figure 15:
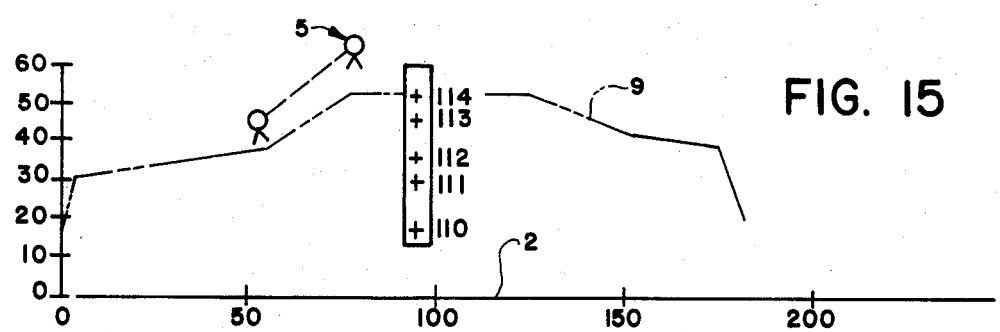

For washing the windshield zone of the vehicle the spray bar will move vertically at a medium speed to one of two locations as the vehicle moves between the 45 and 100 inches linear direction after start as shown in FIG. 15. If the beam of sensor 113 is broken during this linear movement between 45 and 100 inches, the spray bar will stop at a vertical height of 59 inches indicating a standard vehicle roof. If the beam of sensor 114 is also broken during this linear movement period, the spray bar will continue to a 64 inch height as shown in FIG. 15 since the sensors detect that the vehicle has a high roof because the highest most sensing beam of sensor 114 has been broken. Upon reaching this selective height of either 59 or 64 inches, the controller sends another signal to motor 38 which will rotate the spray bar another 45° to the vertical position as shown in FIG. 15 for the washing of the roof zone. This vertical and rotational position of spray bar 5 is maintained for the entire roof. After reaching the roof height all subsequent motion then is directed in a downward direction.

Figure 16:
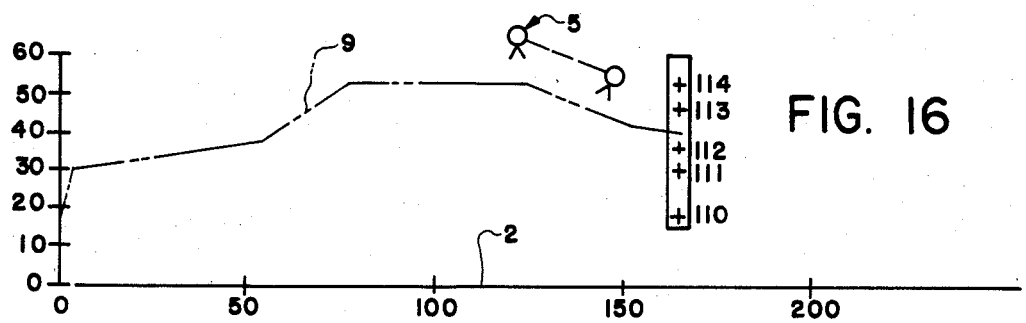
Figure 17:
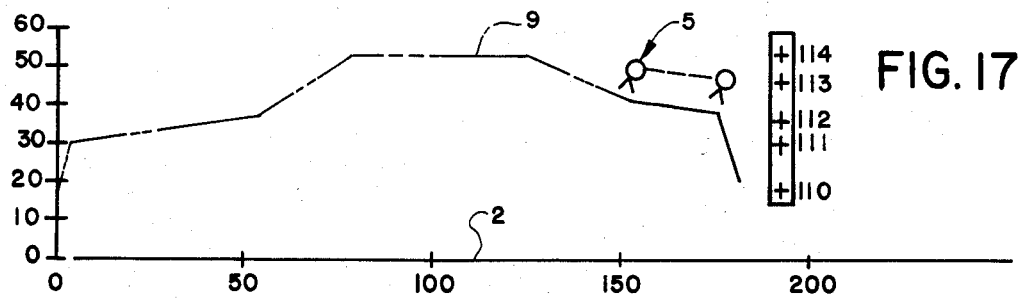

The next zone to be washed is the rear window. If the beam of sensor 113 is maintained for greater than 28 inches or 28 linear pulses after being initially broken, the spray bar is rotated 45° as shown in FIG. 16 and after 40 additional linear counts, the spray bar then moves downwardly 10 inches at a medium speed arriving at a position at the junction of the rear window and rear deck.

To wash the rear deck zone of the vehicle the downward motion of spray bar 5 is continued for an additional five inches but at the slow speed. Also the spray bar is rotated another 45° to the horizontal position facing the rear of the car. Forty linear inches or pulses after beam 2 is restored by the passing of the vehicle the spray bar then moves down to bumper height at a high speed, in which position the nozzles are directed perpendicularly towards the rear of the car 180° from the starting position. The spray bar continues downwardly to its start position during the cleaning of the rear bumper area. After completion of the washing cycle, the controller will signal the spray bar rotation motor 38 to continue to rotate the bar 180° in order to assume the start position for the next washing cycle.

The above example is for illustrative purposes only and the specific heights and linear counts may vary without effecting the concept of the invention. However, the particular counts and heights discussed above are believed to provide the most satisfactory washing operation for nearly all known vehicles. With this sequence of operation the nozzle is maintained between eight and 12 inches from the vehicle surface and the fluid spray from the nozzles impinge generally perpendicularly against the surface being cleaned throughout the washing cycle. The type of controller can vary as well as the particular program contained therein for effecting the operation of spray bar drive motor 53 and of rotational motor 38 as well as other components, such as the pump spray motor.

Although the above description and drawings show the sensors controlling the motion of a spray bar for applying a washing solution on a vehicle, this same concept can be used and spray bar 5 replaced with a rinse bar in which a rinsing solution or wax is applied to the vehicle. Spray bar 5 also can be replaced with a blower mechanism for drying the vehicle after it has passed through the washing station. Maintaining the dryer a predetermined distance from the vehicle surface throughout the drying stage will increase the drying efficiency. Thus the invention need not be limited to just the application of a washing liquid to the vehicle surface. Also the controller and infrared sensors can actuate other types of apparatus used in connection with a car wash system. Most car wash systems will include nozzles located along the sides of the vehicle for spraying the same. These side spray bars usually extend vertically and are located a fixed distance from the side of the vehicle entrapped by the conveyor, with another vertical spray bar located on the untrapped side being movable inwardly and outwardly to correspond closely to the width of the vehicle. The vehicle width can be sensed by various devices mounted in the floor by the vehicle such as a treadleplate construction as shown in U.S. Pat. No. 4,178,948. The operation of these vehicle side spray nozzles also can be coordinated with and controlled by programmable controller 108.

Accordingly, the improved vehicle washing equipment provides for an extremely efficient washing and/or drying of a vehicle by moveably mounting the washing spray bar or dryer in a frame for vertical movement so as to maintain a predetermined spacing from the vehicle surface, in which the movement is controlled by a programmable controller or similar apparatus which is supplied with a series of pulses based upon the profile of the vehicle being sensed by a plurality of vertical sensors arranged in a generally vertical plane in coordination with the linear movement of the vehicle through the wash equipment.

Accordingly, the improved automatic vehicle washing equipment is simplified, provides an effective, safe, inexpensive, and efficient means which achieves all the enumeratred objectives, provides for eliminating difficulties encountered with prior washing equipment and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved automatic vehicle washing equipment is constructed and used, the characteristics of the equipment, and the advantageous, new and useful results obtained; the new and useful structures, devices, elements, arrangements, parts, and combinations, are set forth in the appended claims.

What is claimed is:

1. Automatic vehicle washing equipment for use with a washing system of the type having vehicle conveyor means for conveying a vehicle along a path, said equipment including:
   (a) a vertically movable horizontal spray bar having a plurality of nozzles mounted in spaced relationship thereon for spraying fluid under pressure perpendicularly onto the front, top and rear surfaces of a vehicle moving along its path transverse to the spray bar as the bar moves vertically to permit the vehicle to pass beneath the spray bar;
   (b) means for connecting the spray bar to a source of fluid to be sprayed on the moving vehicle;
   (c) frame means located adjacent the path of the moving vehicle for movably mounting the spray bar thereon for vertical and rotational movement;
   (d) first drive means connected to the spray bar for vertically moving the spray bar in discrete steps along the frame means;
   (e) second drive means connected to the spray bar for rotating the spray bar in discrete steps through an angle of at least 90 degress about a horizontal axis; and
   (f) fixed and second sensing means, said first sensing means being operably connected to the conveyor for detecting the location of the vehicle as it moves along the conveyor, and said second sensing means which includes a plurality of fixed vertically spaced first sensors that are located a predetermined distance in advance of the spray bar, are operably connected with the first and second drive means for controlling the discrete vertical and rotational movement of said spray bar in relationship to the profile of the moving vehicle whereby the nozzles maintain a predetermined generally constant spaced distance from and angular relationship with respect to the vehicle surface throughout the changing profile of said vehicles by the discrete verticle and rotational movement of the spray bar.

2. The vehicle washing equipment defined in claim 1 in which the frame means includes an inverted U-shaped frame member having a pair of horizontally spaced vertical frame sections connected by an upper horizontal frame section.

3. The vehicle washing equipment defined in claim 2 in which the first drive means includes a multiple speed reversible drive motor and flexible cable means connected to the spray bar for moving said spray bar vertically along the spaced vertical frame sections; and in which roller means is mounted on the spray bar for movably mounting the spray bar on the spaced vertical frame sections.

4. The vehicle washing equipment defined in claim 3 in which the flexible cable means includes a section of timing chain connected to the drive motor and sections of cable extending about guide pulleys mounted on the horizontal and vertical frame sections and connected to both ends of the spray bar to provide a positive drive force to the spray bar for movement in both up and down directions.

5. The vehicle washing apparatus defined in claim 3 in which the multiple speed motor has three speeds.

6. The vehicle washing equipment defined in claim 2 in which the spray bar is rotatably mounted by bearings on the spaced vertical frame sections; and in which the second drive means includes a motor operatively connected to an end of the spray bar for rotating said spray bar in its mounting bearings.

7. The vehicle washing apparatus defined in claim 6 in which the second drive means motor is a permanent magnet motor.

8. The vehicle equipment defined in claim 2 in which the frame means further includes a fixed pair of spaced main supports; and in which the inverted U-shaped frame member is pivotally mounted on the fixed main supports to enable the spray bar to be pivoted out of the path of the vehicle moving between the U-shape frame member upon contact of the vehicle with the spray bar in the event of malfunction of the first drive means to prevent damage to said vehicle.

9. The vehicle washing apparatus defined in claim 8 in which releasable latch means is mounted on one of the fixed main supports and engageable with the U-shaped frame member to releasably retain said frame member in operative vehicle washing position; and in which said latch means is actuated upon contact of a vehicle with the spray bar to permit pivotal movement of the U-shaped frame member and spray bar out of the path of the moving vehicle.

10. The vehicle washing apparatus defined in claim 9 in which the releasable latch means includes a spring biased latch plate pivotally mounted on one of the fixed main supports; in which slot means is formed in the latch plate; and in which projection means is mounted on the U-shaped frame member and engageable in the slot means of the latch plate.

11. The vehicle washing apparatus defined in claim 6 in which resilient means is mounted on the spray bar for engagement with a moving vehicle to pivot the spray bar out of the path of said vehicle in case of a malfunction of the first drive means.

12. The vehicle washing apparatus defined in claim 11 in which the resilient means is one or more wheels rotatably mounted on the spray bar.

13. The vehicle washing apparatus defined in claim 1 in which the fixed sensors of the second sensing means includes a plurality of photoelectric sensors mounted in a vertical spaced relationship on a support means located adjacent the travel path of a moving vehicle; and in which programmable controller means is connected to the photoelectric sensors and to the first and second drive means for controlling the operation of said drive means in response to signals generated by said sensors.

14. The vehicle washing apparatus defined in claim 13 in which the support means includes a pair of vertical supports placed on the opposite side of the vehicle travel path; and in which the sensors each includes an emitter and receiver mounted on a respective one of the spaced supports and providing a sensing beam horizontally across and transverse to the vehicle travel path.

15. The vehicle washing apparatus defined in claim 14 in which the sensors are infrared.

16. The vehicle washing apparatus defined in claim 12 in which the fixed sensors include five sensors which are mounted on support means and are designated as first, second, third, fourth and fifth sensors in ascending order along the support means.

17. The vehicle washing apparatus defined in claim 16 in which the first sensor detects the vehicle bumper to actuate spray action and to actuate the first drive means to initiate upward movement of the spray bar at a predetermined speed and for a predetermined time period, said time period being determined by actuation of certain of the other sensors by the vehicle moving past the sensors within a predetermined linear movement of the vehicle along the conveyor.

18. The vehicle washing apparatus defined in claim 17 in which the spray nozzles are pointed generally perpendicularly toward the front of the vehicle as the spray bar is moved vertically upwardly by the first drive means for said predetermined time period.

19. The vehicle washing apparatus defined in claim 17 in which the second sensor detects the start of the vehicle hood at the second sensing means.

20. The vehicle washing apparatus defined in claim 19 in which the third sensor detects the premature occurrence of a windshield if actuated within a predetermined linear movement of the vehicle after the second sensor detects the start of the vehicle hood initiating further upward movement of the spray bar.

21. The vehicle washing apparatus defined in claim 17 in which the fourth sensor detects the windshield area of the vehicle at the second sensing means.

22. The vehicle washing apparatus defined in claim 17 in which the fifth sensor detects the roof area of the vehicle at the second sensing means.

23. The vehicle washing apparatus defined in claim 17 in which the fourth sensor detects the rear window area of the vehicle at the second sensing means.

24. The vehicle washing apparatus defined in claim 1 in which the second sensing means includes controller means; in which the first sensing means generates a series of pulses in relationship to the linear movement of the vehicle, which pulses are supplied to the controller means; and in which the relationship of the detection of the vehicle by the second sensing means with respect to the number of pulses generated by the first sensing means determines the speed of the first drive means and length of time said first drive means is energized.

25. The vehicle washing apparatus defined in claim 24 in which second drive means is intermittently energized to rotate the spray bar approximately 180° to maintain the spray bar nozzles pointed generally perpendicularly toward the vehicle surface as the vehicle passes beneath the spray bar.

26. The vehicle washing apparatus defined in claim 24 in which the controller means is a programmable controller.

27. The vehicle washing apparatus defined in claim 1 in which the spraying fluid is a cleaning liquid.

28. The vehicle washing apparatus defined in claim 1 in which the spraying fluid is heated air for drying the vehicle.

29. Equipment for use in an automatic vehicle washing system of the type having a vehicle conveyor for moving a vehicle along a path, wherein said equipment includes:
   (a) vertically movable in a single vertical plane and rotatable about a horizontal axis a generally horizontal applicatior means for applying a fluid perpendicularly onto the front, top and rear surfaces of a vehicle moving along its path transverse to and beneath the applicator means;
   (b) means for connecting the applicator means to a source of fluid to be applied to the moving vehicle;
   (c) frame means located adjacent the path of the moving vehicle for rotatably and vertically movably mounting the applicator means thereon;
   (d) drive means connected to the applicator means for rotating and for vertically moving said applicator means in a series of discrete steps on and along the frame means;
   (e) programmable controller means for controlling the discrete rotation and vertical movement of the appliator means in relationship to the linear movement of the vehicle along the conveyor and in relationship to the profile of said vehicle;
   (f) first sensing means adapted to be operatively connected to the conveyor for detecting the movement of the vehicle along the conveyor and generating signals in relationship to said movement and for supplying said signals to the controller means; and
   (g) second sensing means including a plurality of fixed vertically spaced sensors for generating a plurality of fixed horizontal beams of radiant energy across the path of the vehicle upstream from the applicator means, said sensors generating signals in relationship to the profile of the passing vehicles, which signals are supplied to the controller means for actuating the drive means in a predetermined sequence of discrete steps in relationship to the signals supplied to the controller means by the first sensing means to maintain the applicator means at a predetermined rotational position and spacing above the vehicle surface as it passes beneath said applicator means.

30. An improved automatic vehicle washing system including:
   (a) conveyor means for moving a vehicle along a predetermined path;

(b) a generally horizontally continuous spray bar extending transversely cross the path of the moving vehicle for spraying fluid under pressure onto a vehicle being moved beneath the spray bar by the conveyor means;
(c) means for connecting the spray bar to a source of pressurized fluid to be sprayed on the moving vehicle;
(d) frame means located adjacent the conveyor means for movably rotationally mounting the spray bar thereon;
(e) first drive means for vertically moving the spray bar in discrete steps along the frame means;
(f) second drive means for rotating the spray bar in discrete steps on the frame means;
(g) first sensing means operably connected to the conveyor means for detecting the location of a vehicle being moved along by the conveyor mbeans;
(h) second sensing means including a plurality of vertically spaced fixed sensor located a predetermined distance in advance of the spray bar for detecting thbe profile of a vehicle being moved toward the spray bar by the conveyor means; and
(i) said first and second sensing means being operatively connected with the first and second drive means for controlling the vertical and rotational discrete movement of the spray bar on the frame means in relationship to the profile of the moving vehicle whereby the spray bar maintains a predetermined generally constant spaced distance from and angular relationship with respect to the vehicle as it is moved by the conveyor means beneath the spray bar.

* * * * *